UNITED STATES PATENT OFFICE.

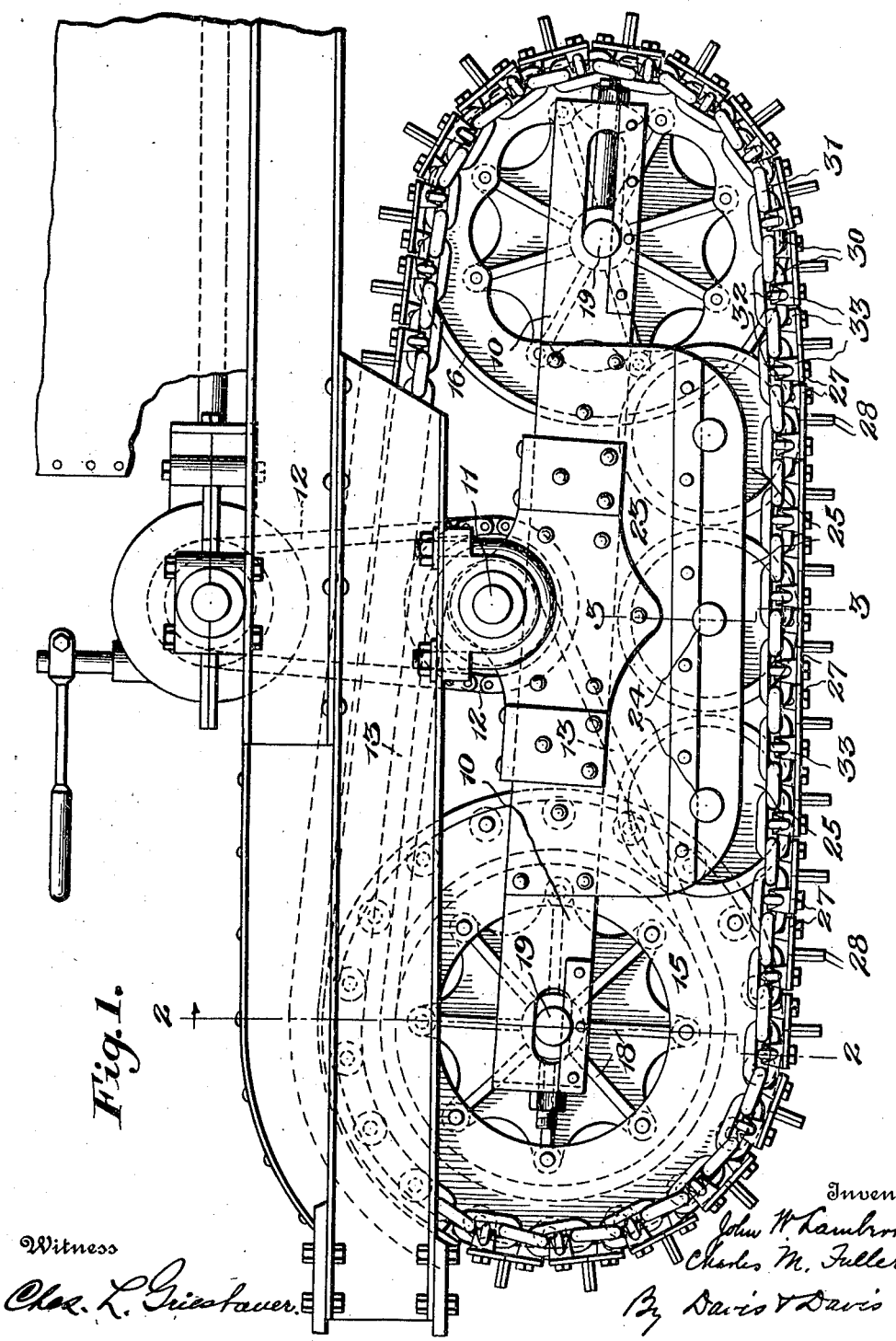

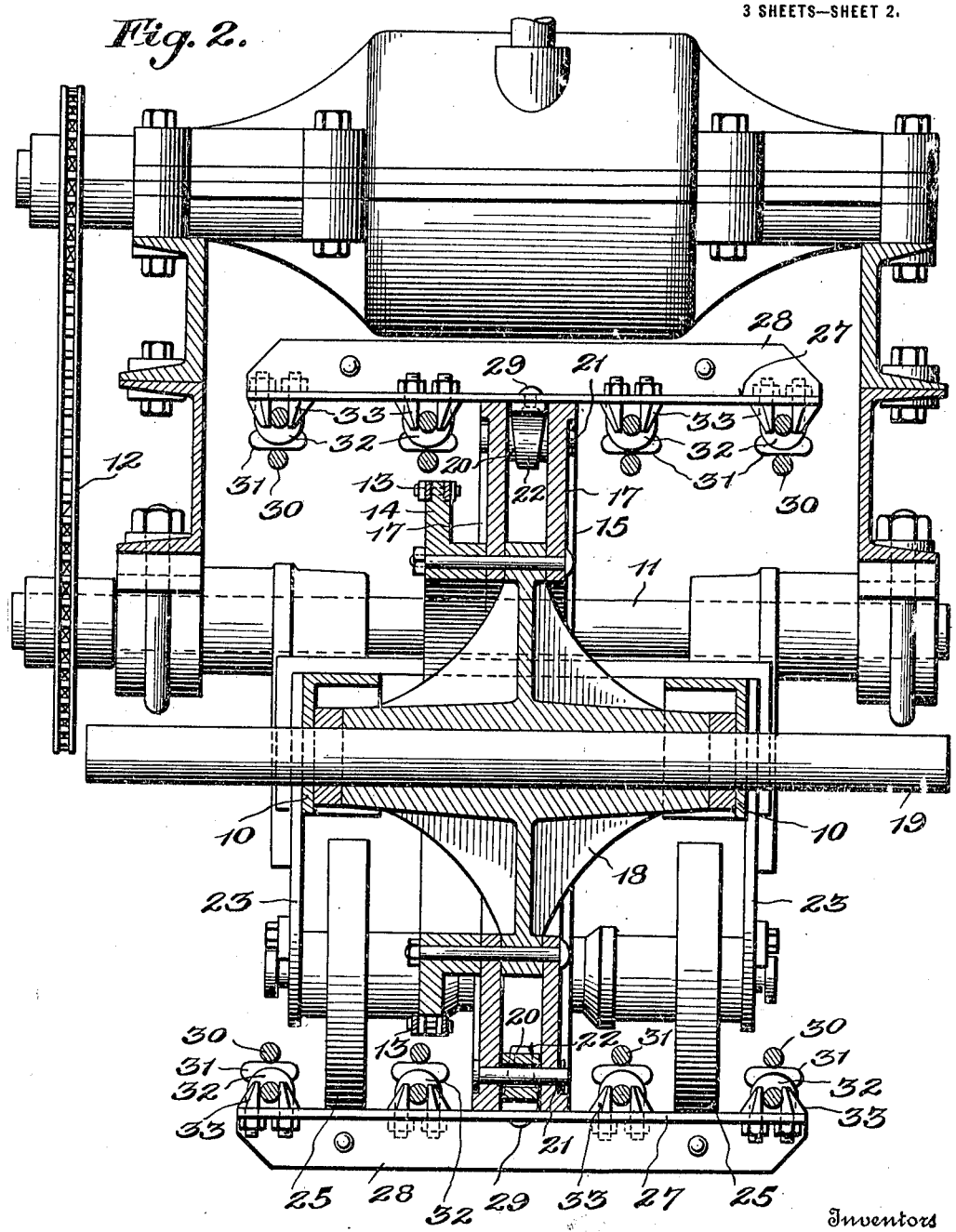

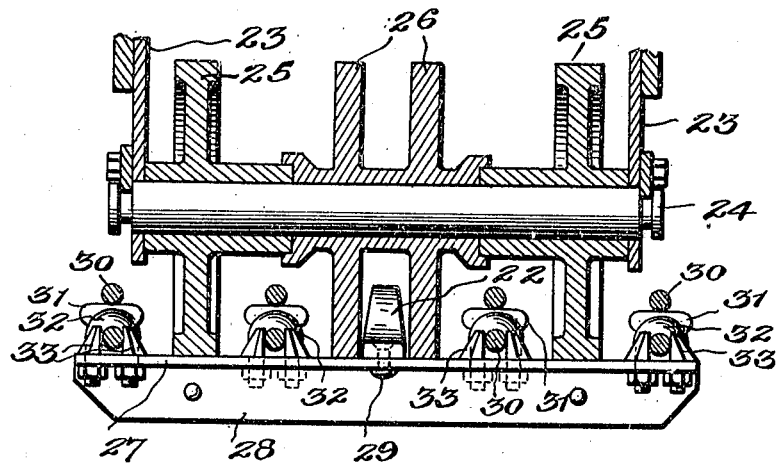
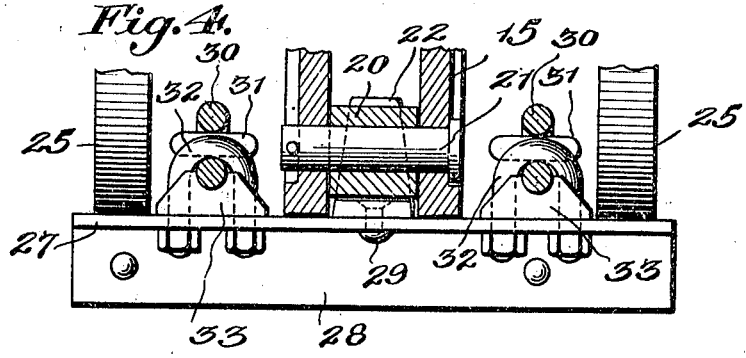
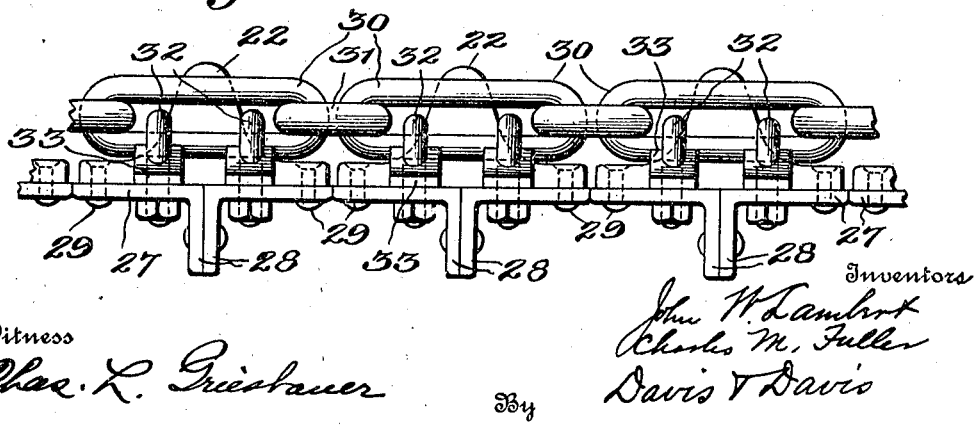

CHARLES M. FULLER, OF EL SEGUNDO, CALIFORNIA, AND JOHN W. LAMBERT, OF ANDERSON, INDIANA.

TRACTOR.

1,241,617.        Specification of Letters Patent.        Patented Oct. 2, 1917.

Application filed December 18, 1916. Serial No. 137,702.

*To all whom it may concern:*

Be it known that we, CHARLES M. FULLER and JOHN W. LAMBERT, citizens of the United States of America, and residents, respectively, of El Segundo, county of Los Angeles, State of California, and Anderson, county of Madison, State of Indiana, have invented certain new and useful Improvements in Tractors, of which the following is a full and clear specification.

The main object of our invention is the production of an efficient, serviceable, durable and comparatively inexpensive traction belt suitable for use in caterpillar tractors, said device being adapted to be readily applied to and removed from the machine and so constructed that it will resist the severest service to which a traction belt of this type is usually subjected. Another and very important object is to so construct the belt and its carrying instrumentalities that the cost of up-keep will be reduced to a minimum, the cost of up-keep of this type of apparatus heretofore having been a very expensive factor.

In the drawings—

Figure 1 is a side elevation of a portion of a tractor provided with our improved traction belt;

Fig. 2 a vertical sectional view on the line 2—2 of Fig. 1;

Fig. 3 a vertical section on the line 3—3 of Fig. 1; and

Figs. 4 and 5 detail views of parts hereinafter described in detail.

Referring to the drawings by numerals, 10 designates the side bars of the tilting frame which is pivoted on a transverse shaft 11, journaled in suitable bearings on the vehicle frame. Shaft 11 is driven through the medium of a sprocket chain 12 which is in turn driven from the motive plant on the vehicle in any suitable manner. The traction belt is driven from shaft 11 by means of a sprocket chain 13 running over sprocket wheel 14 bolted to one face of the forward belt wheel designated generally by numeral 15. The forward belt wheel 15 and the rear belt or tension wheel 16 are constructed alike, each consisting of a pair of flat rings 17 having their inner edges bolted to the outer ends of the spokes of a spider 18 affixed to the shaft 19 journaled in the side bars 10, the spokes of the spider serving to separate the plates or rings a suitable distance to receive between them the belt-engaging rollers 20, each of which is mounted to rotate upon pin 21 carried by the ring 17. The space between the plates 17 is adapted to receive the teeth 22 of the traction belt, and the belt is adapted to run directly on the peripheries of the rings or disks 17, whereby the belt will be supported and (by reason of the fact that the disks straddle the teeth) the belt will be prevented from lateral dislocation. This construction of belt-supporting wheel is further advantageous in that its open construction permits mud and dirt to be readily dislodged from it, thereby preventing accumulated mud and dirt interfering with the proper engagement of the wheels with the traction belt. This sectional construction of the belt wheel is advantageous for the further reason that when a part of a wheel is broken, that part can be renewed separately, thereby avoiding junking the entire wheel structure.

Depending from the side bars 10 are cheek plates 23, and journaled in these plates are the ends of three transverse shafts 24 which carry each a pair of wheels 25 which bear upon the inner face of the traction belt at points between the two main carrying wheels and thus support it in approximately a flat condition while in engagement with the ground. The middle one of the shafts 24 carries in addition a double wheel 26 of the same diameter as the wheels 25, the two disks of this wheel being supported far enough to straddle the row of teeth 22, thereby not only assisting the wheels 25 in supporting the middle portion of the belt, but also assisting the belt-carrying wheels in guiding the belt in such manner as to prevent lateral dislocation, this prevention of undue lateral shifting of the belt being an exceedingly important factor in view of the great variety of rough usages to which machines of this type are subjected in actual operation under greatly varying conditions.

The traction belt consists of a series of tread slats or plates 27, each consisting of a pair of angle irons riveted together along their flanges 28, these flanges being arranged to project outwardly so as to engage into the ground and thus serve as traction devices. Each of the tread plates is provided on its inner face with one of the aforesaid teeth 22, the teeth being attached to the plates by suitable rivet bolts 29 to adapt the teeth to be separately and readily renewed when broken, thereby minimizing the upkeep of the belt. Any suitable means other than the rivet bolts 29 may be employed for fastening these teeth to the plates, as is obvious. The tread plates are linked pivotally together by a plurality of endless chains, four being shown in Figs. 2 and 3, while the type shown in Fig. 4 may be constructed with but two or three of these chains.

Each chain consists of a series of long links 30 and a series of connecting ring-links 31, each of the long links being rigidly fastened in an edgewisely upright position on the inner face of one of the tread plates and the connecting rings being arranged opposite the joint between said plate and the adjacent tread plate, whereby each pair of adjacent tread plates is connected together by a plurality—preferably two—pivotal joints, thus giving to the belt a maximum flexibility and reducing friction to a minimum. Each of the long links is preferably clamped to its tread plate by means of a pair of clip bolts 32 which clamps one of the tread bars of the link against a pair of saddle blocks 33. It will be observed that in addition to flexibility and ease of running, our belt possesses the further important characteristic that it may be readily repaired, it being made up of parts which may be quickly removed when broken and replaced by new parts, thus making it possible to keep the belt in first-class condition at minimum cost.

It will be understood that although we illustrate an angle iron form of tread slat, we may use a channel iron or any other suitable plate or bar. It will be understood also that the type of chain may be varied greatly without departing from the invention and that, therefore, we especially desire to avoid limiting ourselves to any particular shape of link or link cross-section.

Having thus described our invention, what we claim is:

1. In a tractor of the type set forth, a toothed traction belt, and a pair of wheels for carrying and driving the belt, each of said wheels consisting of a pair of separated peripheral rings adapted to bear against the inner face of the belt and straddle the teeth on the belt, and teeth-engaging rollers mounted between the plates.

2. In a machine of the class set forth, a toothed belt, belt-driving and supporting wheels, each consisting of a spider-hub, a pair of ring-plates fastened to the outer ends of the spokes of the spider and thereby held apart from each other, and teeth-engaging means carried between said rings.

3. In a tractor of the class set forth, a tiltable frame supported on the tractor, belt-carrying wheels at the opposite end of the frame, a belt carried by said wheels and provided with a row of teeth on its interior face, and a pair of connected wheels engaging the inner face of the belt intermediate said two belt-carrying wheels, these connected wheels being spaced apart sufficiently to bear against the belt closely adjacent to the opposite side of said row of teeth, so as to thereby assist in preventing lateral distortion of the belt.

4. In a tractor of the class set forth, a tiltable frame supported on the tractor, belt-carrying wheels at the opposite ends of said frame, a toothed traction belt carried by said wheels, and a plurality of wheels engaging the inner face of the belt intermediate said two belt-carrying wheels, a pair of said intermediate wheels being arranged to straddle the row of teeth on the inner face of the belt, for the purpose set forth.

5. A traction belt for tractors provided on its inner face with means for engaging the belt driving wheels, said belt consisting of a series of tread-slats, and means applied to the inner face of the belt for linking said slats together, said means consisting of a plurality of chains each embodying a series of main links secured edgewisely upright to the inner faces of the slats, and a series of connecting links arranged at the joints between the slats.

6. A traction belt for tractors, consisting of a series of tread slats, each provided with a tooth on its inner face, and means applied to the inner face of the belt for linking said slats together, said means consisting of a plurality of chains embodying a series of links rigidly fastened to the plates and a series of connecting links connecting the aforesaid links, for the purpose set forth.

In testimony whereof we hereunto affix our signatures this 21st day of Nov., 1916.

CHARLES M. FULLER.
JOHN W. LAMBERT.